235-382 SR
8/14/79 XR 4,164,320

United States Patent [19] [11] 4,164,320
Irazoqui et al. [45] Aug. 14, 1979

[54] PATIENT AND SPECIMEN IDENTIFICATION MEANS AND SYSTEM EMPLOYING SAME

[75] Inventors: Carlos A. Irazoqui, New York; Emil A. Scordato, Bronxville, both of N.Y.

[73] Assignee: Medical Laboratory Automation, Inc., Mount Vernon, N.Y.

[21] Appl. No.: 709,321

[22] Filed: Jul. 28, 1976

Related U.S. Application Data

[63] Continuation of Ser. No. 509,413, Sep. 26, 1974, abandoned.

[51] Int. Cl.[2] .......... G06F 15/20; G06K 5/00; G06K 7/08; G06K 19/06

[52] U.S. Cl. .......... 235/375; 235/382; 235/449; 235/493

[58] Field of Search .......... 360/1; 235/61.11 D, 235/61.11 E, 61.12 M, 375, 449, 493, 382; 346/35

[56] References Cited

U.S. PATENT DOCUMENTS

| | | | |
|---|---|---|---|
| 3,320,618 | 5/1967 | Kuch et al. | 346/35 |
| 3,562,727 | 2/1971 | Abbott et al. | 235/61.11 D |
| 3,619,568 | 11/1971 | Teplin | 235/61.12 M |
| 3,715,570 | 2/1973 | Weichselbaum et al. | 360/1 |
| 3,831,006 | 8/1974 | Chaffin et al. | 235/61.7 R |

*Primary Examiner*—James W. Moffitt
*Attorney, Agent, or Firm*—William P. Keegan

[57] ABSTRACT

An element suitable for attachment to a hospital wristband or patient specimen container such as test tubes or the like is disclosed which element has a coating of magnetizable material that is encoded along a circular track with patient identification and other desired information relating to the patient and the system employing such elements. The element is used to associate positively a patient with a specimen taken from him, or with medicine or treatment to be given him.

8 Claims, 7 Drawing Figures

PATIENT AND SPECIMEN IDENTIFICATION MEANS AND SYSTEM EMPLOYING SAME

This is a continuation of application Ser. No. 509,413 filed Sept. 26, 1974 now abandoned.

This invention relates to identification tags or like elements, and more particularly to such as are used in hospitals and laboratories to mark and identify patient specimens that are to be tested.

In the daily operations of many present day hospitals, it is not uncommon for tests involving patients' body fluids to be required on a large number of patients. The extent and scope of the laboratory testing that must be done places a tremendous burden on the hospital staff, but one that should be performed with one hundred percent accuracy. That is, the tests designated for performance by an attending physician should be performed in a timely fashion, and, more importantly, the test results obtained must be associated with the patient for whom the tests were ordered. This last requirement should be carefully adhered to particularly since in many hospitals hundreds of similar tests are being performed during a single operations, and the specimen containers are manually marked by the hospital staff and thus susceptible to mislabeling. Under such circumstances, it is quite possible for patients' specimens to be inadvertently interchanged. Inasmuch as such an occurence could lead to a wrong diagnosis and to improper treatment or therapy, the avoidance of such mistakes is to be much desired.

The importance of correctly identifying patients' test specimens is patently apparent and it has been the object of prior art disclosures. For example, in U.S. Pat. No. 3,320,618 there is disclosed test tubes containing blood components to be tested which are identified by means of protruding tabs bearing perforated or magnetic coding to identify the patients from whom the specimens were drawn. The identification may be in the form of an identification number which is read from the tab and then printed out on a sheet alongside the test results from the specimen in the test tube from which the identification number was first read. In this way, there is an assurance that the test results are properly associated with the patient from whom the specimen giving rise to the test result was taken.

While those working in the art have been aware of the problems therein, the solutions so far suggested have been subject to certain shortcomings. For example, in the disclosure referred to above, the use of information bearing tabs on test tubes has made it difficult if not impossible to process the test tubes through automatic testing equipment. This for the reason that the test tubes would have to be oriented in such a way that the information bearing tabs would be properly presented to the tab reading mechanism. Thus, in the area where positive patient identification of specimens or samples is most to be desired, that is, in automatic testing equipment where many specimens are subjected, seriatum, to a testing procedure, the prior art disclosed identification devices are the source of additional problems.

Therefore, it is the object of the present invention to provide an improved means for identifying specimen containers.

It is a further object of the present invention to provide such identifying means as will not interfere with the transport of the specimen containers through automatic processing or testing equipment.

It is still another object of the invention to provide specimen identification means that can readily be machine read and the information provided automatically compared to other identification bearing means or transferred to additional records.

Yet another object of the invention is to provide patient identifying means that can be machine read to insure that medicines and biologicals are given to the proper patient, and in the case of blood transfusions, for example, that the patient receives blood compatible with his own.

In carrying out the invention, there is provided a collar for a test tube or the like which collar has a magnetizable coating suitable for magnetic encoding on a peripheral surface along a circular track. Thus, when encoding the collar, or reading the coding placed thereon, a magnetic read/write head can be moved into alignment with the magnetic track and orbited to scan the coded information or to write the coded information. Other elements which require identifying information, such as wristbands, or tags such as may be used on blood bags, will likewise be provided with a circular magnetic track that can be scanned by an oribiting magnetic head.

A feature of the invention is that when used on test tubes or the like, the information bearing surface does not protrude from the specimen container.

Another feature of the invention is that a circular track of information can be read by simpler equipment than can a short linear track of coded information.

Additional features of the invention may be gained from the foregoing and from the description of a preferred embodiment of the invention which follows.

In the drawing

Figure 2:
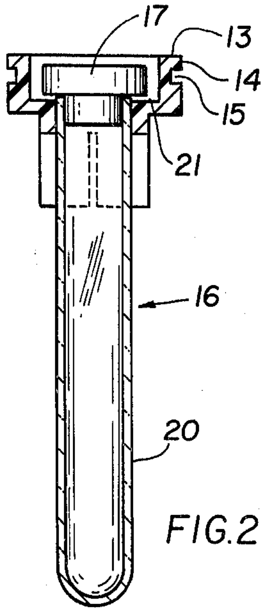
FIG. 2 is a sectional view of a Vacutainer with an identification collar mounted thereon.
Figure 1:
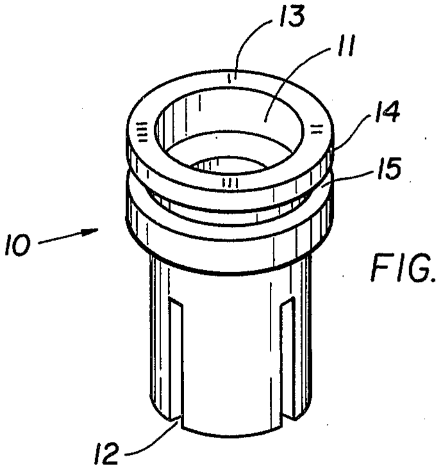
FIG. 1 is a perspective view of the test tube identification collar according to the present invention.

Reference is now made to FIGS. 1 and 2 of the drawing which illustrate an identification collar 10 on which is encoded suitable information concerning the patient for whom the collar is issued. Collar 10 generally is a plastic cylinder having a central longitudinal bore 11 the cross section of which conforms to the member on which collar 10 is to be mounted. In the embodiment shown, the central bore has a circular cross section to enable the collar to be placed on a test tube, cuvette, or Vacutainer. Moreover, the lower portion of the collar is provided with longitudinal peripheral slits 12 to enable the collar to be more easily slipped over a tubular member. The upper end surface 13 of collar 10 is coated with a magnetizable material to permit the collar to be encoded by means of a magnetic coding head with information that may be desired on the collar. If preferred, the magnetizable material may be provided on the outside surface 14 of collar 10 so that the coded information could appear on the outside periphery thereof.

Collar 10 is also provided with a circumferential groove 15 which facilitates the collar being gripped in a magnetic read/write unit. The groove may be omitted if other gripping means are employed.

In FIG. 2, collar 10 is shown mounted on Vacutainer 16. Vacutainers are widely used in hospitals, especially when blood has to be drawn from a patient for blood typing or other tests. An example of another test that requires a blood sample to be taken from a patient is a prothrombin time test. The Vacutainers are supplied to the hospital by the manufacturer with the rubber plug 17 stoppering a test tube 20 which has been evacuated to a predetermined degree of vacuum. In use, a catheter tube having a hollow needle at each end is first inserted into the vein of a patient from whom a blood sample is to be taken. The needle at the other end of the catheter tube is then pushed through the plug 17 to the interior of tube 20 whereupon a predetermined quantity of blood will be drawn depending on the initial vacuum in tube 20. The needle is then withdrawn from plug 17 and the patient's vein and the sample of blood is within the sterile confines of the Vacutainer. Because of plug 17, which projects beyond the outside surface of tube 20 to permit the plug to be readily grasped and removed from tube 20 by a technician, collar 10 is formed with a shoulder 21 and a wider internal diameter portion which fits around plug 17. Of course the embodiment shown will fit on test tubes that are not provided with plugs, and if the collar is to be used exclusively on such tubes it could be in the form of a straight tubular cylinder.

Figure 4:
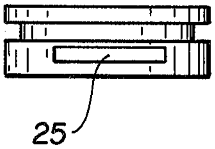
FIG. 4 is a front elevational view of the identification button shown in FIG. 3.
Figure 7:
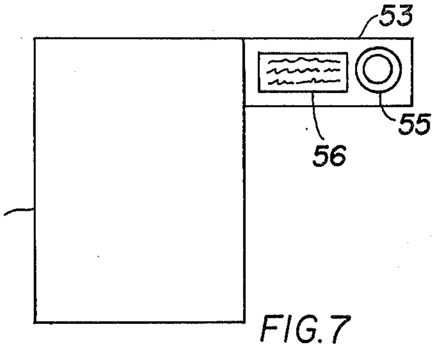
FIG. 7 is a schematic illustration of a blood bag having an identification tag attached thereto.
Figure 3:
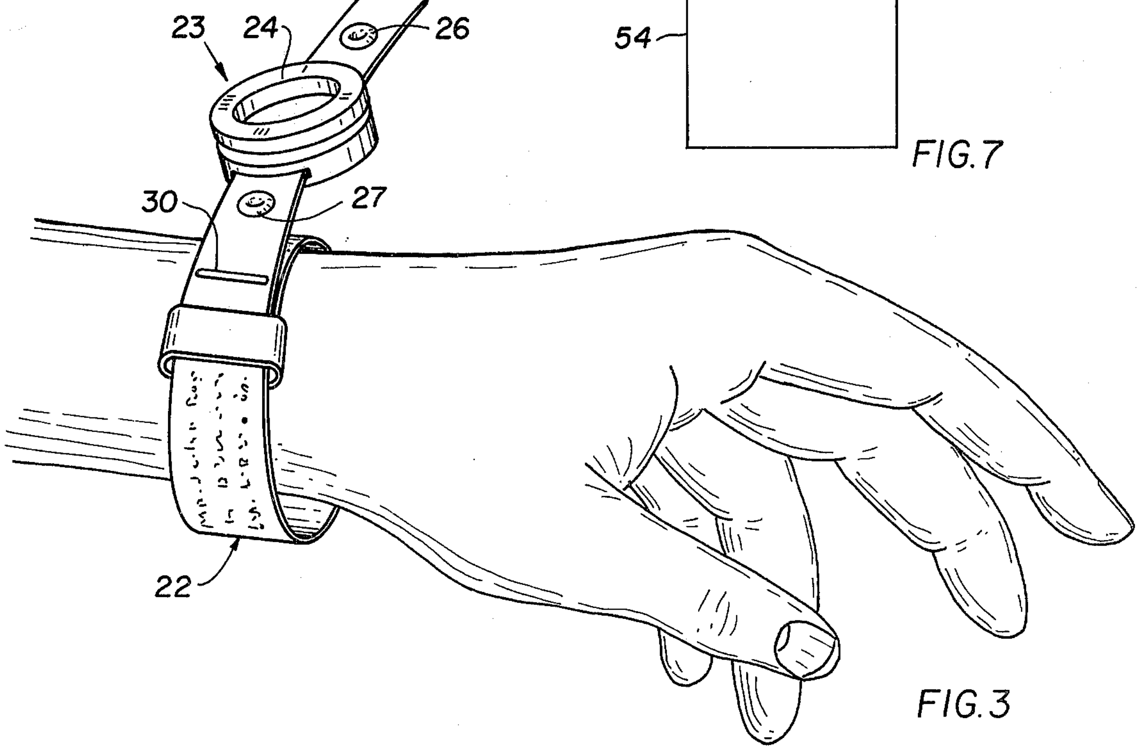
FIG. 3 is a view showing an identification wristband with an identification button secured thereto.
Figure 6:
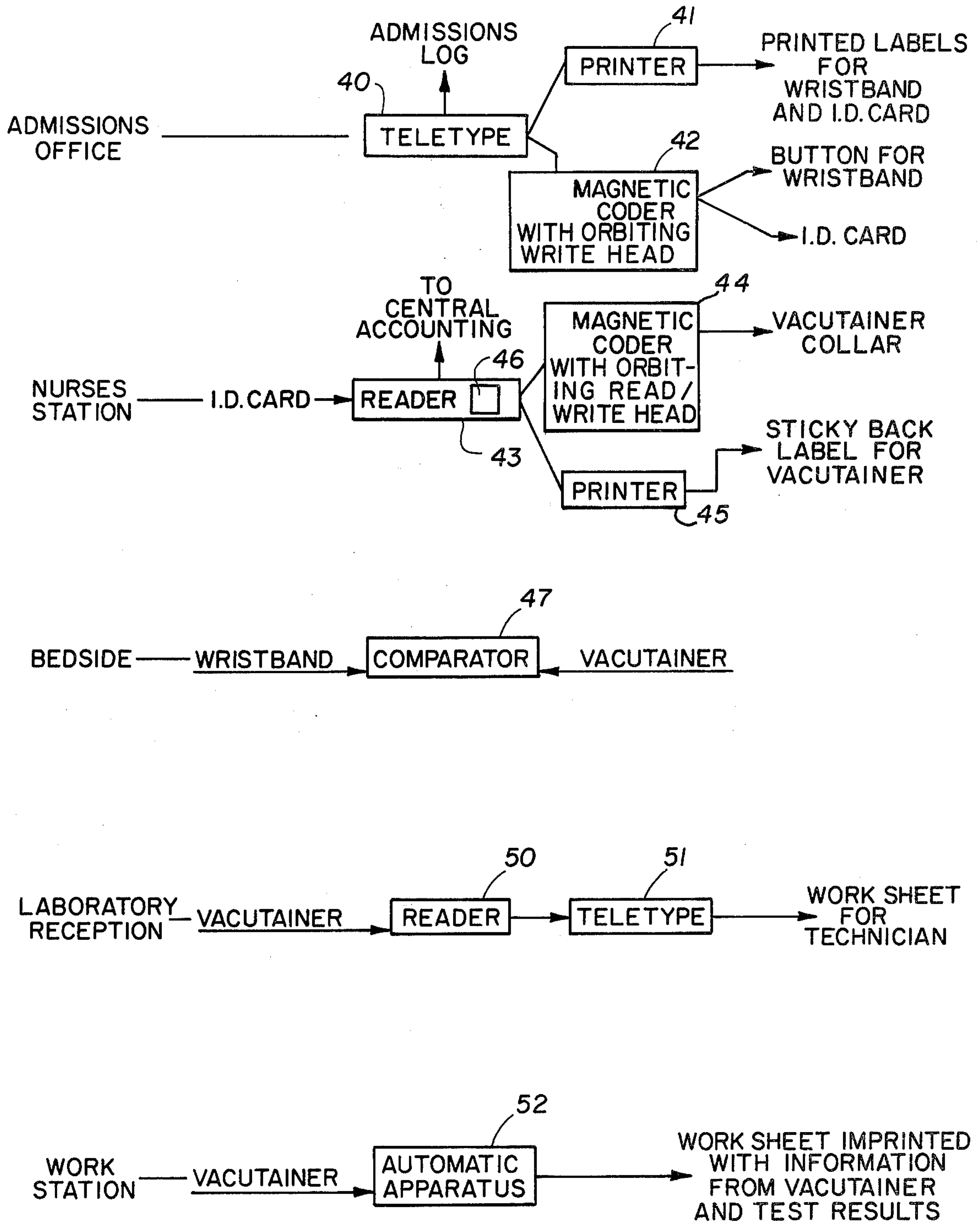
FIG. 6 is a schematic flow chart illustrating the use of the FIGS. 2, 4, and 5 identification elements in a blood testing system.

FIG. 3 illustrates a wristband 22 of the type that is used almost universally in hospitals today. The wristband is shown with a plastic button 23 on which a magnetizable coating is placed to enable the upper surface 24 to be encoded magnetically with information that will be machine readable. Button 23 may be secured to wristband 22 in any convenient way, either in the hospital or by the wristband manufacturer. In the embodiment shown, button 23 is provided with a transverse tunnel 25 (FIG. 4) through which the end of wristband 22 can pass. To keep button 23 on the wristband, rivets 26 and 27 are placed on both sides of button 23 as shown. If button 23 is placed on the wristband as described by the manufacturer, a slit 30 may be provided in the hollow wristband to permit the usual printed identification strip to be inserted in the wristband. It is to be emphasized that the identification element may be secured to the wristband by any suitable means and the foregoing is intended to be illustrative only. In fact, the identification element could be a plastic tab, again coated with a magnetizable material, secured to some part of the wristband, preferably the clasp. The magnetic track on such a tab would be circular as in the case of collar 10 and button 23.

Figure 5:
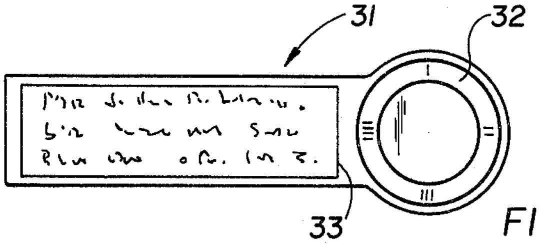
FIG. 5 is a plan view of an identification card suitable for use in connection with the present invention.

One further element that might be useful in an identification system embodying the present invention is shown in FIG. 5. An identification card 31, which may be similar in thickness to the well known plastic credit cards, is shown with a circular magnetic track 32 on which information may be magnetically encoded so that the card will be machine readable. A sticky back label 33 bearing the patient's name and any other desired man readable information will be stuck to the card. Card 31 is shown with one rounded end, the end where the magnetic track is found, which permits the card to be accurately positioned in a magnetic read/write unit. Any other configuration could be used for aligning the card with the magnetic read head in a read/write unit.

Usually the man readable label provided for wristband 22, and the sticky back label 33 for identification card 31, will be prepared in the admissions office of the hospital. At the same time, the magnetic track 32 on card 31 and the magnetic track on button 23 will be coded with the patient's name and such other control information as may be desired. Then, if the hospital has a central computer system, whenever the patient undergoes a hospital procedure or test, the wristband button 23 or the identification card 31 can be read in a suitable instrument and appropriate data transmitted to the central computer for association with the patient's hospital record. This can be useful for accounting purposes as well as for medical records and control purposes.

Having thus described the fundamental elements of the invention, their use in a positive patient specimen identification system will be described in conjunction with a patient who is admitted to the hospital for a thrombotic condition and who is to undergo anti-coagulant therapy. One of the first tests to be performed is a prothrombin time test which will give an indication of the clotting characteristics of the patient's blood. To insure that the test result is correctly associated with the patient from whom the blood is drawn, and that the test result is properly entered on the patient's chart for study by the attending physician, the positive identification elements hereinabove described may be utilized as follows.

When the patient arrives at the hospital admissions office, the admitting clerk prepares an admissions log identifying the patient and providing whatever additional information is required by the hospital. The teletypewriter or Teletype unit 40 on which the log is typed will be connected electrically to a strip printer 41 which prints man readable identifying information onto a strip which is then inserted in a wristband of the type well known and in use in most hospitals. Printer 41 also provides a sticky back lable containing man readable identification information for attachment to ID card 31. At the same time the wristband strip and sticky back label are being printed, a coder 42 is magnetically encoding the information onto an identification or ID card of the type illustrated in FIG. 5, and onto a magnetic button of the type shown in FIG. 3. Both the ID card 31 and the magnetic button 23 thus contain whatever information is desired. This information may simply include the patient's name and perhaps a hospital and medical insurance plan number. Of course, the information coded will depend on the procedures followed within a particular hospital.

The wristband having the man readable strip inserted therein and the machine readable magnetically encoded button attached thereto is placed on the patient's wrist, and the ID card is given to the patient who thereupon proceeds to his assigned room in the hospital. Upon arrival at the room, the ID card is given to the nurse who brings it to the nurses' station for the assigned room. The ID remains at the nurses' station during the patient's stay in the hospital, and it serves as an information source for all services performed for the patient. For example, the nurses' station will be provided with a keyboard reader 43 that is capable of reading the information magnetically encoded on the ID card and transferring the information thus read to magnetic coder 44 and to a strip printer 45.

Thus, if a medicine is to be given to a patient, his ID card is selected from those at the nurses' station by the nurse reading the sticky back labels on all the ID cards.

The selected card is inserted in scanner 43 which then reads the magnetically encoded information from the card and this information, together with information that the nurse keyboards about the prescription prescribed by the patient's doctor, can be transmitted electronically to a computer in the central accounting office for billing purposes and to a printer in the pharmacy to enable the prescription to be prepared. As a further example, if the patient is to have X-rays taken, this fact can be keyboarded and transmitted to the central accounting office along with the patient's name read from the ID card.

If it is assumed that a prothrombin time test is to be run for the patient, as earlier assumed, the patient's doctor will have left an order for this procedure at the nurses' station. The nurse will then place the patient's ID card in the keyboard scanner 43 and a Vacutainer collar 10 in magnetic coder 44. The patient identification information will be transferred from the ID card to the Vacutainer collar and the nurse will keyboard additional information at keyboard 46 indicating that a prothrombin time test is to be performed and this information will also be encoded on the Vacutainer collar. If more than one test is to be performed on a single blood sample, information as to the various tests can be coded on a single collar. However, if all of the tests called for cannot be performed on a single sample, more than one Vacutainer collar will be encoded, each one only containing the patient's identification data and the test symbols of the tests that can be performed on a single sample. At the same time a Vacutainer collar is being encoded, printer 45 is printing the identical information on a sticky back label which is then applied to a Vacutainer along with the magnetically encoded collar. Thus each Vacutainer is both man readable and machine readable. While the description covered the situation where the collar 10 is placed on the Vacutainer after being encoded, the collar can be placed on the Vacutainer before being encoded. Also it is possible for the Vacutainer itself to have a magnetizable coating placed thereon so that the need for a separate collar may be obviated. In such case, the upper rim or periphery of the Vacutainer would be provided with the magnetizable coating.

The encoded Vacutainer is then taken by the phlebotomist to the patient's room. After insuring that the Vacutainer bearing the information associated with the patient is indeed the correct Vacutainer by placing the Vacutainer and the magnetic button on the patient's wristband in a portable comparator unit 47 carried by the phlebotomist, a blood sample is taken from the patient directly into the Vacutainer. If the information coded on the Vacutainer collar and on the wristband button did not correspond, comparator unit 47 would have given a warning signal to indicate that the wrong Vacutainer was being used. No blood sample would have been drawn until the Vacutainer bearing the patient's information was selected and read in the comparator unit 47.

The blood sample containing Vacutainers collected by the phlebotomist are then sent to the laboratory for processing and test. The laboratory receptionist places the Vacutainers sequentially in scanner 50 which reads the magnetically encoded information on each Vacutainer and causes teletypewriter 51 to print work sheets for the laboratory bearing the various patients' names and the test or tests that are to be performed on each sample. There will generally be one work sheet for each nurses' station, each sheet bearing the names of all patients assigned to that station whose blood is being tested. To insure that each work sheet bears only the patients' names from a single nurses' station, the laboratory receptionist may sort the Vacutainers and present them to scanner 50 in groups, each of which is associated with a particular nurses' station and each of which causes the printing of a separate work sheet. In a more sophisticated system, the Vacutainers could be presented to scanner 50 in a random order and the information read from the Vacutainers stored in the memory of a computer which first collates all the data from the Vacutainers originating from a single nurses' station before transmitting the data to teletypewriter 51 which then prints out work sheets, each associated with a different nurses' station.

The work sheets prepared by the laboratory receptionist and the Vacutainers are then delivered to the laboratory technician who is to perform the tests and who prepares the samples for testing. As the sample in each Vacutainer is tested, the test result is entered on the work sheet alongside the patient's name, the association being made from the man readable label on the Vacutainer. The work sheets with the test results inscribed thereon are then distributed to the various nurses' stations.

While the system described in somewhat rudimentary in that it calls for some human association of data, especially in the laboratory, the magnetically encoded Vacutainer collars lend themselves to a much more elaborate and sophisticated system which is to be preferred, especially in a large metropolitan hospital. For example, the laboratory receptionist could simply sort out the Vacutainers depending on the tests to be performed on each. All Vacutainers scheduled to undergo the same test could be sent to a work station automated for that test or group of tests. The work sheet for that work station would then be prepared as the tests are being conducted. Thus, the information encoded on the Vacutainer collar could be read and transcribed to a work sheet, and as the test on the sample in the Vacutainer is completed, the test result could be printed automatically alongside the transcribed information. In such a system there is no human intervention as in the simpler system described above. Also, the laboratory could be in communication with each nurses' station so that as a sample from one station is being tested the test result could be transmitted directly to that station along with the patient's identification information and automatically printed on a log by a teletypewriter located at the nurses' station.

The aspect of the present invention which makes such an automatic system possible is the circularly encodable collar 10 provided for the Vacutainer. The collar 10, which takes little more room than the Vacutainer itself, enables the Vacutainers to be placed in a turntable or other conveyor carrying the Vacutainers to an automatic testing apparatus, and the collars to be read by an orbiting magnetic read head under which the Vacutainers pass. There is no need to orient each Vacutainer as would be the case if the coded information was placed on a tab attached to the Vacutainer. The recorded information would have a start of message signal and the reading apparatus would not start to transcribe the encoded information until this signal is read.

The present invention has been described in conjunction with the laboratory testing of a patient's blood sample, but the invention may also be used in a blood transfusion system to insure that a patient is administered blood of the correct type, i.e., compatible with his own. In such a system, the patient's blood sample will be drawn and typed using all the safeguards heretofore described. Patient identification information will be taken automatically from the patient's Vacutainer collar and together with the laboratory determined blood type data will be recorded at the hospital blood bank. A patient information card, similar to that shown in FIG. 5, but now also containing the patient's blood type data may be prepared for use in the blood bank.

When blood donors are admitted to the hospital or to the blood bank for purposes of donating blood, they, like a hospital patient, will be given a wristband having a man readable label and a magnetically encoded button, both containing donor identification information. Thereafter, when donating blood, this magnetically encoded information will be transferred from the wristband button to the Vacutainer collar of a Vacutainer containing a sample of the donor's blood and to a blood bag tag 53 which is attached to the bag 54 which collects the donor's blood. The information on the blood bag tag will be encoded magnetically on a circular track 55 of magnetizable material provided on the tag. A sticky back label 56 with man readable data thereon is also prepared for attachment to the blood bag tag.

The blood bag 54, which contains the donor's blood, is then sent to the blood bank for any processing that may be necessary or desired and for storage. The tag 53 on the blood bag will contain information, both magnetically encoded and man readable, as to the donor's identification only. At the same time the donor's blood sample will be sent to the laboratory to be typed. After the blood is typed, a work sheet containing the donor identification information and the blood type classification information is sent to the blood bank for record purposes. Thus, the blood bank will have a log listing blood donors and their blood types.

Now, if the patient requires a blood transfusion, the blood bank records are searched to determine the patient's blood type and the name of a donor having the same blood type. The record searching may be done visually through written records or it may be done automatically in a computerized system in which blood bank data is stored in a computer memory. For the latter type system, a patient blood data card of the type referred to above would be useful.

A blood bag containing the blood of a donor determined to have the same blood type as the patient requiring the transfusion is then obtained from the blood bank's general storage. The patient's identification and blood type is cross matched with that of the donor and the information is recorded in a cross match log for blood bank records. Also, the patient's identification information is placed or encoded on the magnetizable coating provided on the blood bag tag. This may be done with a keyboard actuated magnetic writing unit, but preferably the information is transferred from the patient's blood data card, on file in the blood bank, to the blood bag tag in a magnetic read/write unit that encodes the information on the blood bag tag as it reads the information from the blood data card.

Since the foregoing described assignment of blood to a particular patient may be made prior to the actual need for the blood, a further check will be made before the blood is dispensed by the blood bank. Thus, when the blood is actually called for, the patient's blood data card and the blood bag tag will be placed in a comparator unit that magnetically reads the patient identification information from the blood data card and the patient assignment information from the blood bag tag. If there is a correspondence between the patient identification and the patient assignment information, the comparator unit emits a signal to indicate that the proper blood is being dispensed.

A further check is made prior to the transfusion when the dispensed blood bag is brought to the patient's bedside. Here, the patient's magnetically encoded wristband button and the blood bag tag are placed in a comparator unit that magnetically reads the encoded information carried by the wristband button and the blood bag tag. If the patient identification information on both elements correspond, a positive signal is given and the transfusion takes place. Conversely, if there is no correspondence, a conspicuous visual signal and/or a loud audible signal is given to warn against effecting the transfusion. While reference is made to blood type alone, it is to be understood that other blood factors may be determined to insure complete compatibility of the donor's and the patient's blood.

Having thus described the invention it is to be understood that many changes could be made to the preferred embodiment described without departing from the spirit and scope of the invention, particularly with regard to the type system in which Vacutainer collars, wristband buttons, blood bag tags, and ID cards are used. Therefore, it is intended that the foregoing specification and the drawing be interpreted as illustrative rather than in a limiting sense.

What is claimed is:

1. In a patient-container correlation system in which a patient is provided with identification means having machine readable data identifying the patient thereon and containers for receiving samples from the patient or for holding drugs or the like to be administered to the patient are provided with means attached thereto for receiving machine readable data identifying the patient, the combination comprising: patient identification card means for delivery to a patient service ordering station, said card means having a magnetizable coating thereon disposed on a flat surface so that patient identification data can be coded thereon along an annular track; a wristband member for attachment to a patient, said member having a magnetizable coating thereon disposed on a flat surface so that patient identification data can be coded thereon along an annular track; coding mechanism means having an orbiting magnetic writing head for coding machine readable patient identification data onto said patient identification card means and onto said wristband member, and means associated with said coding mechanism means for printing man readable labels for attachment to said patient identification card means; data receiving means to be attached to a patient related item, said means having a magnetizable coating thereon disposed on a flat surface so that machine readable patient identification data can be coded thereon along an annular track; magnetic read/write means for a patient service ordering station having orbiting magnetic head means for reading patient identification coded data from said patient identification card means and writing said coded data onto said data receiving means, and means associated with said magnetic read/write means for printing man readable labels for attachment to said data means; and comparator means for comparing patient identification data coded onto said data receiving means with patient identification data coded on said wristband member.

2. The system according to claim 1 wherein said data receiving means is a label having space thereon for man readable data and including means for attaching the label to a container or other patient related item.

3. The system according to claim 1 wherein said data receiving means is a medical procedure other having space thereon for man readable data.

4. The system according to claim 1 wherein said data receiving means is a blood bag tag having space thereon for man readable data.

5. The system according to claim 1 wherein said magnetic read/write means includes keying means for magnetically coding information on said data receiving means in addition to the patient identification data transferred thereto from said patient identification card means.

6. The system according to claim 5 wherein said magnetic read/write means includes means for printing man readable labels for attachment to patient related items along with said data receiving means.

7. The system according to claim 1 wherein said data receiving means comprises a collar member having a longitudinal aperture through which a test tube or the like projects in frictional engagement therewith.

8. The system according to claim 7 wherein the longitudinal aperture in said member comprises an aperture having a first diameter substantially equal to the diameter of a test tube or the like for which said member is provided and a tandem aperture concentric with said first diameter aperture having a second diameter greater than said first diameter and sufficient to accommodate a stopper placed in the test tube or the like.

* * * * *